United States Patent [19]

Peppiatt

[11] Patent Number: 5,112,138
[45] Date of Patent: * May 12, 1992

[54] RESEALABLE REUSABLE FLEXIBLE PLASTIC BAG WITH LOOP HANDLE

[75] Inventor: Harry R. Peppiatt, Doylestown, Pa.

[73] Assignee: Paramount Packaging Corporation, Chalfont, Pa.

[*] Notice: The portion of the term of this patent subsequent to Dec. 15, 2004 has been disclaimed.

[21] Appl. No.: 536,057

[22] Filed: Jun. 8, 1990

Related U.S. Application Data

[63] Continuation of Ser. No. 425,500, Oct. 19, 1989, abandoned, which is a continuation of Ser. No. 140,445, Jan. 4, 1988, abandoned, and a continuation-in-part of Ser. No. 931,298, Nov. 14, 1986, abandoned, which is a continuation-in-part of Ser. No. 821,561, Jan. 21, 1986, Pat. No. 4,713,839, which is a continuation-in-part of Ser. No. 388,381, Jun. 14, 1982, Pat. No. 4,573,203, which is a continuation-in-part of Ser. No. 3,110, Jan. 14, 1987, abandoned.

[51] Int. Cl.$^5$ .................... B65D 30/20; B65D 33/10; B65D 33/16
[52] U.S. Cl. ......................... 383/29; 383/21; 383/41; 383/203; 383/61
[58] Field of Search ................ 383/41, 61, 66, 903, 383/21, 29, 203

[56] References Cited

U.S. PATENT DOCUMENTS

| | | |
|---|---|---|
| Re. 25,966 | 2/1966 | Wilcox . |
| 351,378 | 10/1886 | Hill . |
| 424,411 | 3/1890 | Fielder . |
| 1,701,097 | 2/1925 | Broderick . |
| 1,733,219 | 10/1929 | Duvall . |
| 1,771,429 | 7/1930 | Wisbith ............................. 383/66 |
| 1,808,375 | 6/1931 | Plooster . |
| 1,910,789 | 5/1933 | Brady . |
| 1,971,064 | 8/1934 | Corlette et al. . |
| 2,021,787 | 11/1935 | Janowitz . |
| 2,603,407 | 7/1952 | Crary ................................... 229/54 |

(List continued on next page.)

FOREIGN PATENT DOCUMENTS

| | | |
|---|---|---|
| 507869 | 11/1954 | Canada . |
| 907574 | 8/1972 | Canada . |
| 1103624 | 6/1981 | Canada . |
| 1922955 | of 0000 | Fed. Rep. of Germany . |
| 1928438 | 2/1965 | Fed. Rep. of Germany . |
| 1967615 | 6/1967 | Fed. Rep. of Germany . |
| 1967622 | 8/1967 | Fed. Rep. of Germany . |
| 7121512 | 6/1971 | Fed. Rep. of Germany . |
| 2811219 | 9/1979 | Fed. Rep. of Germany . |
| 2811219 | 9/1979 | Fed. Rep. of Germany . |
| 1262658 | of 1961 | France . |
| 1363090 | 9/1964 | France . |
| 1551228 | 12/1968 | France . |
| 632707 | 12/1949 | United Kingdom . |
| 878107 | 9/1961 | United Kingdom . |
| 1022595 | 3/1966 | United Kingdom . |
| 2131392 | 9/1984 | United Kingdom . |

Primary Examiner—Stephen P. Garbe
Attorney, Agent, or Firm—Fitzpatrick, Cella, Harper & Scinto

[57] ABSTRACT

The present invention is directed to a bag having an outer unitary piece of flexible plastic material including generally rectangular front and rear plastic panels and a gusset connecting the panels at a first end portion of the bag, and an inner unitary piece of flexible plastic material including generally rectangular front and rear panels and a gusset connecting the last-mentioned panels at the first end portion of the bag. The ends of the inner and outer unitary pieces of flexible plastic material opposite the first end of the bag are open to facilitate introducing goods into the bag. The side edges of the gussets and the panels are connected together so that the bag when filled can approximate the shape of a hexahedron with the gusset of said outer piece of flexible plastic material being flattened and closing the first end portion of the bag. At least a portion of the outer unitary piece is frangible so as to facilitate access to the goods in the bag and thereafter permit reuse of the bag. A closure device is connected to the outer unitary piece so as to prevent access to the goods in the bag when the closure device is closed and for facilitating access to the goods in the bag when the closure device is opened.

25 Claims, 4 Drawing Sheets

U.S. PATENT DOCUMENTS

| | | | |
|---|---|---|---|
| 2,603,409 | 7/1952 | Crary | 229/54 |
| 2,679,969 | 6/1954 | Richter . | |
| 2,722,367 | 11/1955 | Verlin | 229/54 |
| 2,729,150 | 3/1956 | Gelbcke . | |
| 2,745,593 | 5/1956 | Brady . | |
| 2,978,769 | 4/1961 | Harrah | 24/201 |
| 3,006,532 | 10/1961 | Fine . | |
| 3,065,845 | 11/1962 | Nichols . | |
| 3,066,845 | 12/1962 | Mattaway . | |
| 3,078,895 | 2/1963 | Silver . | |
| 3,093,295 | 6/1963 | Kugler . | |
| 3,140,038 | 7/1964 | Laguerre | 229/54 |
| 3,145,908 | 8/1964 | Smith . | |
| 3,181,583 | 5/1965 | Lingenfelter | 150/3 |
| 3,206,104 | 9/1965 | Cohen | 229/52 |
| 3,208,492 | 9/1965 | Braithwaite | 150/12 |
| 3,240,420 | 3/1966 | Membrino | 229/54 |
| 3,282,493 | 11/1966 | Kamins et al. | 229/54 |
| 3,283,994 | 11/1966 | Miller | 229/55 |
| 3,309,008 | 3/1967 | Huck . | |
| 3,339,606 | 9/1967 | Kugler | 150/3 |
| 3,358,904 | 12/1967 | Van Houtte | 229/54 |
| 3,370,630 | 2/1968 | Haugh et al. | 150/12 |
| 3,372,857 | 3/1968 | Brayla . | |
| 3,378,189 | 4/1968 | Dickson . | |
| 3,402,749 | 9/1968 | Kinzler | 150/3 |
| 3,462,068 | 8/1969 | Suominen | 229/54 |
| 3,471,871 | 10/1969 | Nociti et al. | 4/142 |
| 3,473,589 | 10/1969 | Gotz | 150/3 |
| 3,481,051 | 12/1969 | Davis, Jr. . | |
| 3,485,437 | 12/1969 | Gruentzel et al. | 383/903 |
| 3,486,683 | 12/1969 | Kamins et al. . | |
| 3,490,681 | 1/1970 | Niemeyer . | |
| 3,490,682 | 1/1970 | Schwarzkopf . | |
| 3,497,130 | 2/1970 | Stahl . | |
| 3,502,258 | 3/1970 | Kugler et al. . | |
| 3,506,048 | 4/1970 | Jortikka | 150/1.7 |
| 3,507,443 | 4/1970 | Gerard . | |
| 3,514,033 | 5/1970 | Goodwin . | |
| 3,520,470 | 7/1970 | Korn et al. . | |
| 3,554,435 | 1/1971 | Martinez . | |
| 3,567,110 | 3/1971 | Susuki | 229/54 |
| 3,568,918 | 3/1971 | Blomqvist . | |
| 3,580,486 | 5/1971 | Kugler | 229/54 |
| 3,610,516 | 10/1971 | Esty . | |
| 3,640,450 | 2/1972 | Lieberman | 229/53 |
| 3,693,785 | 9/1972 | Sincavage et al. . | |
| 3,721,383 | 3/1973 | Dufes . | |
| 3,738,567 | 6/1973 | Ruda | 229/62 |
| 3,738,568 | 6/1973 | Ruda | 229/62 |
| 3,746,215 | 7/1973 | Ausnit et al. | 222/92 |
| 3,807,679 | 4/1974 | Burke et al. . | |
| 3,827,472 | 8/1974 | Uramoto | 150/3 |
| 3,858,789 | 1/1975 | Verbeke . | |
| 3,966,524 | 6/1976 | Lehmacher | 156/182 |
| 3,982,687 | 9/1976 | Auer et al. . | |
| 3,991,801 | 11/1976 | Ausnit | 150/3 |
| 3,998,380 | 12/1976 | Kanelous . | |
| 4,041,851 | 8/1977 | Jentsch . | |
| 4,078,659 | 3/1978 | Rensner | 206/432 |
| 4,148,431 | 4/1979 | Lepisto . | |
| 4,165,832 | 8/1979 | Kuklies et al. | 229/54 |
| 4,191,230 | 3/1980 | Ausnit | 150/3 |
| 4,235,653 | 11/1980 | Ausnit | 156/91 |
| 4,252,269 | 2/1981 | Peppiatt | 229/54 |
| 4,285,376 | 8/1981 | Ausnit | 150/3 |
| 4,539,705 | 9/1985 | Baines . | |
| 4,550,439 | 10/1985 | Peppiatt et al. . | |
| 4,573,203 | 2/1986 | Peppiatt . | |
| 4,682,366 | 7/1987 | Ausnit et al. | 383/65 |
| 4,713,839 | 12/1987 | Peppiatt | 383/41 |
| 4,721,396 | 1/1988 | Sengewald . | |
| 4,738,546 | 4/1988 | Sengewald . | |
| 4,781,474 | 11/1988 | Sengewald . | |
| 4,854,733 | 8/1989 | Schwinn . | |
| 4,877,336 | 10/1989 | Peppiatt . | |

RESEALABLE REUSABLE FLEXIBLE PLASTIC BAG WITH LOOP HANDLE

RELATED APPLICATIONS

This is a continuation of copending application Ser. No. 425,500 filed Jun. 8, 1990, now abandoned, a continuation of application Ser. No. 140,445 filed Jan. 4, 1988, now abandoned a continuation-in-part of co-pending application Ser. No. 931,298 filed Nov. 14, 1986 by H. R. Peppiatt and J. S. Thomas, Jr., now abandoned, and assigned to the assignee herein. Application Ser. No. 931,298 is a continuation-in-part of co-pending application Ser. No. 821,561 filed Jan. 21, 1986 in the name of co-inventor, H. R. Peppiatt, assigned to the assignee herein, and now allows as U.S. Pat. No. 4,713,839. U.S. application Ser. No. 821,561 is a continuation-in-part of U.S. Pat. No. 4,573,203.

This is also a continuation-in-part of co-pending application Ser. No. 3,110, filed Jan. 14, 1987, now abandoned, by H. R. Peppiatt, and assigned to the assignee herein.

The instant application is filed in the name of H. R. Peppiatt who solely contributed the newly added subject matter.

BACKGROUND OF THE INVENTION

Flexible plastic bags of the general type involved herein are known. For example, see U.S. Pat. Nos. 4,252,269 and 4,573,203 in the name of inventor, H. R. Peppiatt, and assigned to the assignee herein. When goods are packaged and sealed in the bag as disclosed in U.S. Pat. No. 4,252,269, the bag is destroyed when one gains access to the contents of the bag. Such destruction of the bag is considered to be an unnecessary waste. In U.S. Pat. No. 4,573,203, there is disclosed a flexible plastic bag which enables goods to be sealed therein while allowing the seal to be broken whereby the goods can be accessed and the bag reused without a seal. The present invention is directed to a solution of the problem of designing a flexible plastic bag which is capable of bearing heavy loads such as large quantities of granular goods sealed therein while allowing the seal to be broken whereby the goods can be accessed and the bag reused and resealed as well.

SUMMARY OF THE INVENTION

The present invention is directed to a bag having an outer unitary piece of flexible plastic material including generally rectangular front and rear plastic panels and a gusset connecting the panels at a first end portion of the bag, and an inner unitary piece of flexible plastic material including generally rectangular front and rear panels and a gusset connecting the last-mentioned panels at the first end portion of the bag. The ends of the inner and outer unitary pieces of flexible plastic material opposite the first end of the bag are open to facilitate introducing goods into the bag. The side edges of the gussets and the panels are connected together so that the bag when filled can approximate the shape of a hexahedron with the gusset of said outer piece of flexible plastic material being flattened and closing the first end portion of the bag. At least a portion of the outer unitary piece is frangible so as to facilitate access to the goods in the bag and thereafter permit reuse of the bag. A closure device is connected to the outer unitary piece so as to prevent access to the goods in the bag when the closure device is closed and for facilitating access to the goods in the bag when the closure device is opened.

BRIEF DESCRIPTION OF THE DRAWINGS

For the purpose of illustrating the invention, there is shown in the drawings a form which is presently preferred, it being understood, however, that this invention is not limited to the precise arrangements and instrumentalities shown.

DETAILED DESCRIPTION

Figures 1, 2, 3:
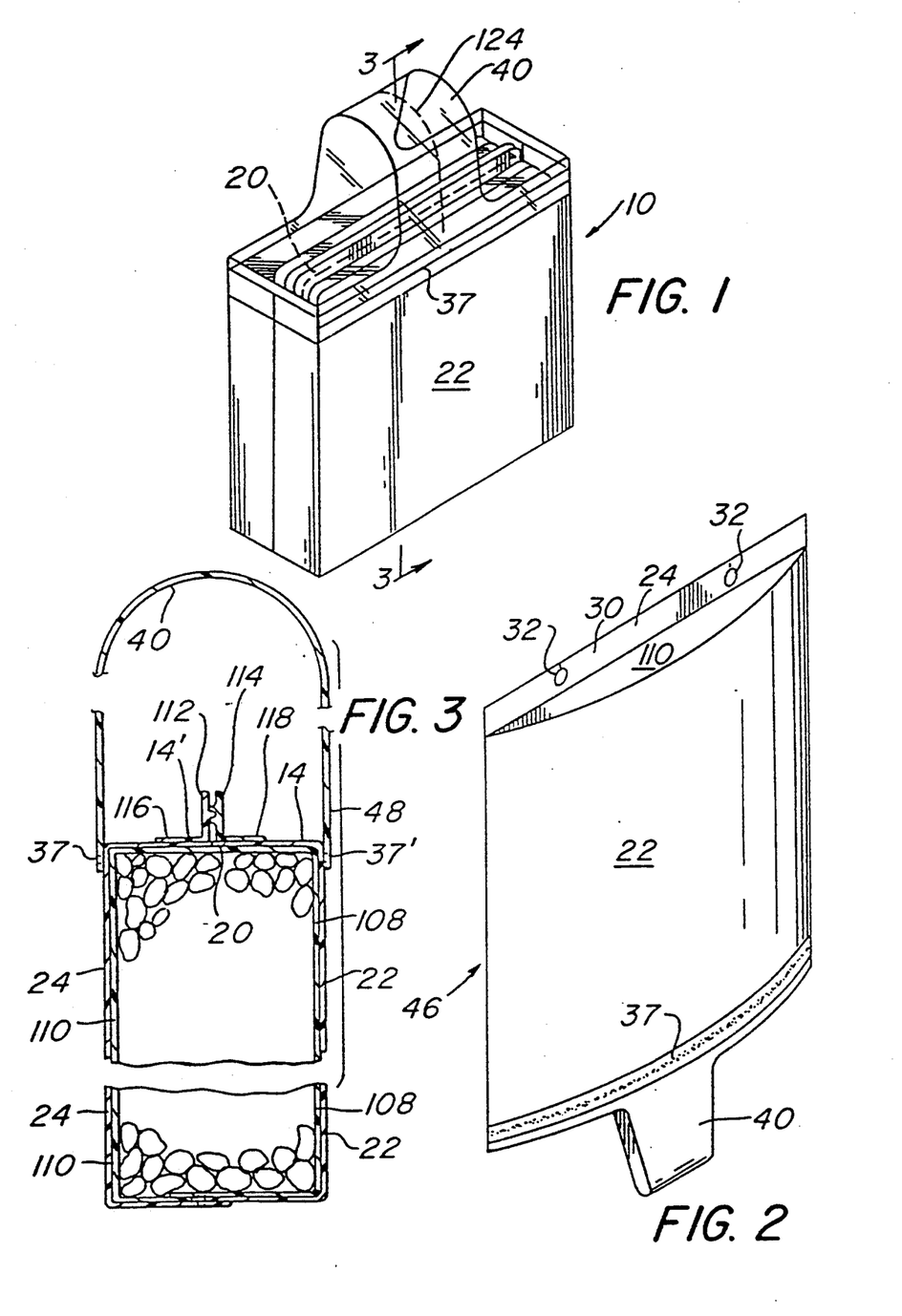
FIG. 1 is an isometric view of a filled package made from the bag of the present invention.
FIG. 2 is an isometric view of a bag in accordance with the present invention prior to filling.
FIG. 3 is a sectional view taken along the line 3—3 in FIG. 1.

Referring to the drawings in detail, wherein like numerals indicate like elements, there is shown in FIG. 1 a package designated generally as 10, in the filled state, made from the bag of the present invention. The package is sealed so as to prevent access to the goods except in a manner which will be readily apparent and described in greater detail hereinafter.

Figure 4A:
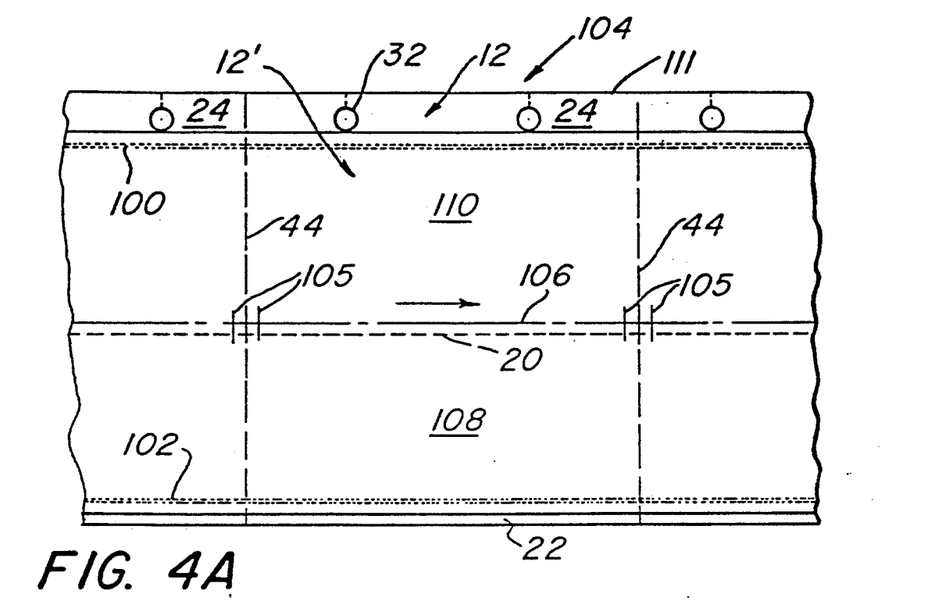
FIG. 4A is a plan view of the composite web from which the bag of the present invention is made and before the web is folded.

Referring to FIG. 4A, webs 12, 12' of flexible thermoplastic material are placed one on top of the other and welded together at line welds 100, 102 to form a continuously moving composite web 104. The plastic material may be polypropylene, polyester, polyethylene, etc. Preferably, web 12 is opaque and web 12' is transparent. A transparent web 12' is preferred so that the goods within the package can be viewed before the seal on the bag is broken as described more fully hereafter. Although two webs are preferred, a single web could be used.

Notches or slits 105 are cut into composite web 104. The notches 105 cut through webs 12, 12'. The notches are preferably placed perpendicular to and center on a fold line 106. The notches 105 are preferably placed approximately 3/16 inches from a line 44 and on both sides of line 44. Notches 105 provide stress relief at the upper corners of the bag.

Web 12 is preferably provided with a line of perforations 20 proximal the fold line 106. The composite web 104 is then folded such that web 12 forms an outer bag structure while web 12' forms an inner bag structure. Thus, the composite web 104 is first folded along fold line 106 so as to form an outer front panel 22 and an outer rear panel 24, an inner front panel 22 and an outer rear panel 110. See FIG. 4B.

The composite web is then folded inwardly along fold line 106 to form an outer gusset connecting the outer panels and designated generally as 14 and an inner gusset connecting the inner panels and designated generally as 14'. See FIG. 4C and FIG. 5. The outer gusset 14 has an inner boundary portion 16 and outer boundary portions 18, 18'. The perforations 20 lie along the inner boundary portion 16 of the outer gusset 14 so that they are accessible to the user.

The web 12 and consequently the outer panels 22 and 24 are preferably composed of a laminate of an inner layer and an outer layer as described in co-pending application Ser. No. 388,381, now U.S. Pat. No. 4,573,203. Use of a laminate provides a choice of different materials having different properties. The inner layer is preferably opaque and has printing on its outer surface. The outer layer is transparent and is adhesively or otherwise bonded to substantially the entire inner layer surface and overlies the printing to protect the same. Preferred dimensions and materials are an inner layer of white opaque polyethylene having a thickness of 0.00125 inches while the outer layer is clear polyethylene having a thickness of 0.00175 inches.

Figure 4B:
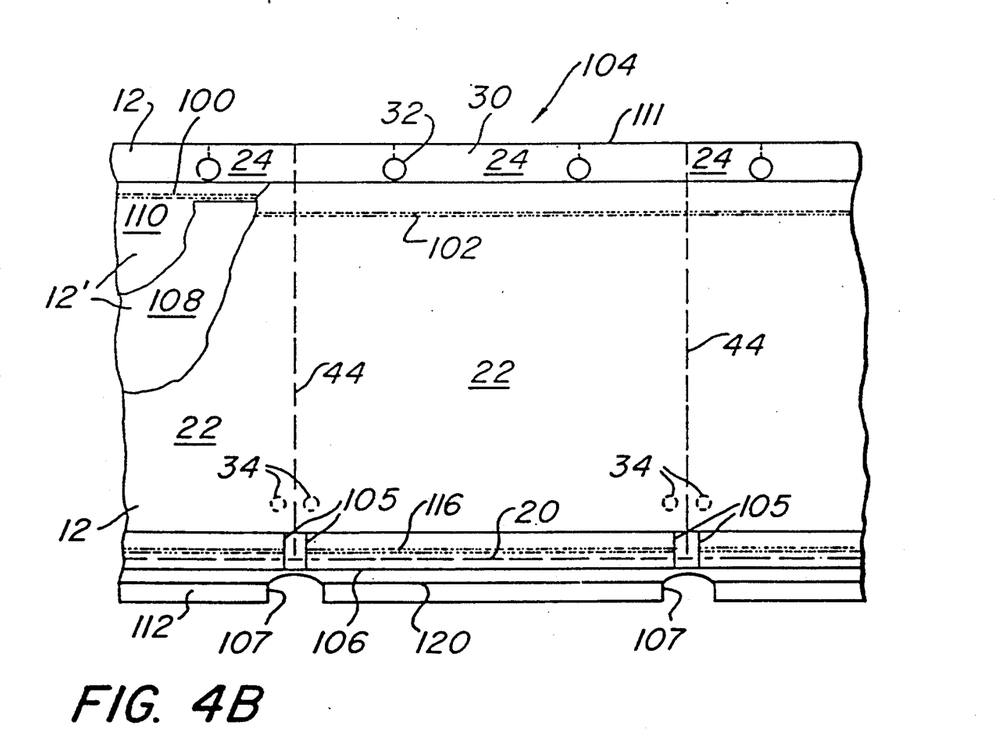
FIG. 4B is a plan view of the composite web after the web is folded with the closure means attached to the web.

As shown in FIG. 4B, when the composite web 104 is folded over, the outer front panel 22 is shorter in height than the outer rear panel 24 whereby the rear panel has a tab 30 projecting beyond the front panel 22. Within the tab 30, there are provided arcuate perforations defining one or more holes 32 with perforation lines connecting the holes to the tab edge 111.

Figures 5, 6:
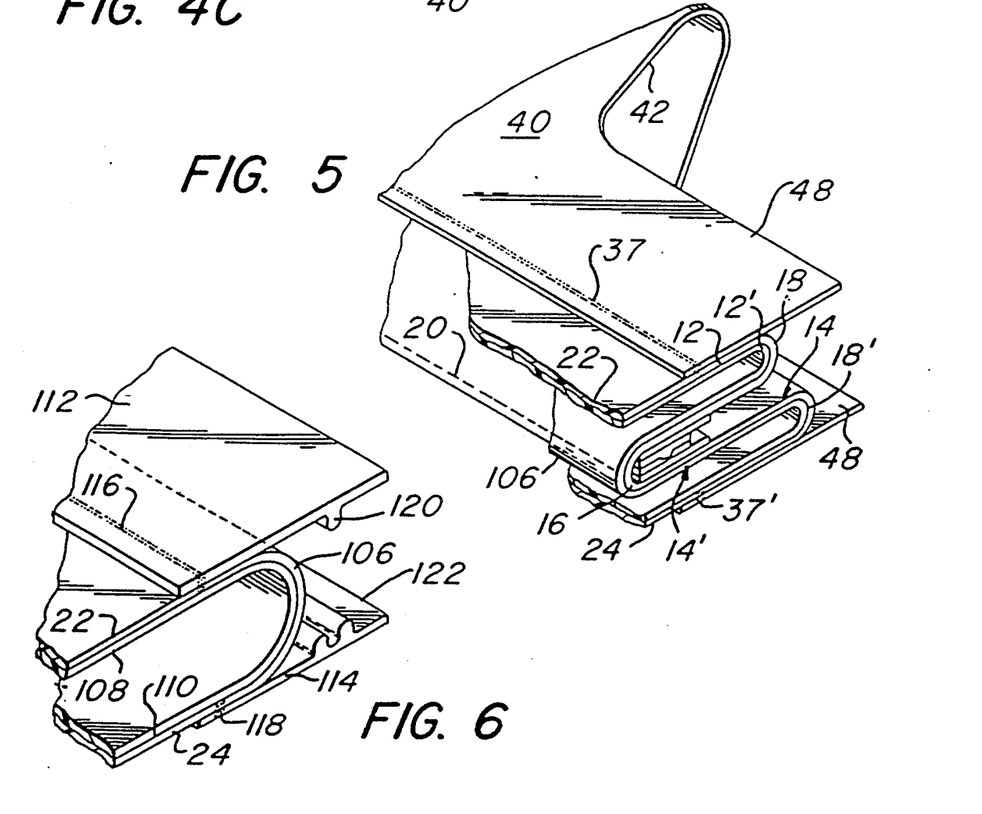
FIG. 5 is an isometric view of a portion of the bag showing the inner and outer gussets spaced inwardly from a closed side edge of the bag.
FIG. 6 is an isometric view of a portion of the composite web in FIG. 4B showing the closure means attached thereto.

Referring to FIG. 4B and FIG. 6, after the composite web 104 is folded but before the gusset is formed, webs 112, 114 of thin transparent flexible thermoplastic material are secured by line welds 116, 118 to the outer panels 22, 24 on opposite sides of fold line 106. Webs 112, 114 are preformed with mating portions 120, 122 which enable the webs to be separably connected to each other by means of a press-lock fit. As shown more clearly in FIG. 6, mating portion 120 on web 112 is in the shape of a longitudinally extending rib and mating portion 122 on web 114 is in the form of a pair of flexible longitudinally extending walls defining a groove whereby portion 122 is adapted to frictionally engage the rib. Preferably, the rib is seated in the groove, releasably securing webs 112, 114 together before the webs are welded to the outer panels 22, 24.

A preferably U-shaped notch 107 is then formed in the webs 112, 114. U-shaped notch 107 is formed by a welding tool, which is well known in the art. The tool forms the U-shaped notch 107 and importantly welds together webs 112, 114 along the U-shaped profile. The welded U-shaped profile provides a seal which when the webs 112, 114 are joined together, the cavity in which the product is placed is completely sealed from the external environment. This feature is very important when food products are stored in the bag and was not disclosed in the earlier embodiment found in the previous applications.

The U-shaped notch 107 is approximately 1½ inches wide or extends about ¾ inch into the bag from line 44. After the individual bags are separated along line 44, discussed below, the U-shaped notch becomes a J-shaped notch. Each arcuate, J-shaped notch becomes an arcuate, J-shaped end profile of each of the mating webs 112, 114 of each bag formed between adjoining pairs of lines 44. J-shaped notches and end profiles are thus provided at the opposing ends of each web 112, 114 of each bag. The J-shaped notches further secure together the resulting J-shaped end profiles by virtue of the fact that the tool forming those notches and profiles welds together the webs 112, 114 along the profiles. The same notches simultaneously provide arcuate end profiles and seals to the mating portions 120, 122 of each bag.

Optional vent holes 34 are formed through composite web 104 and are spaced from line 44 and U-shaped notch 107. The vent holes 34 are not used when food or perishable product are stored in the bag.

The composite web is then folded inwardly to form the gussets 14, 14'. See FIG. 4C.

Figure 4C:
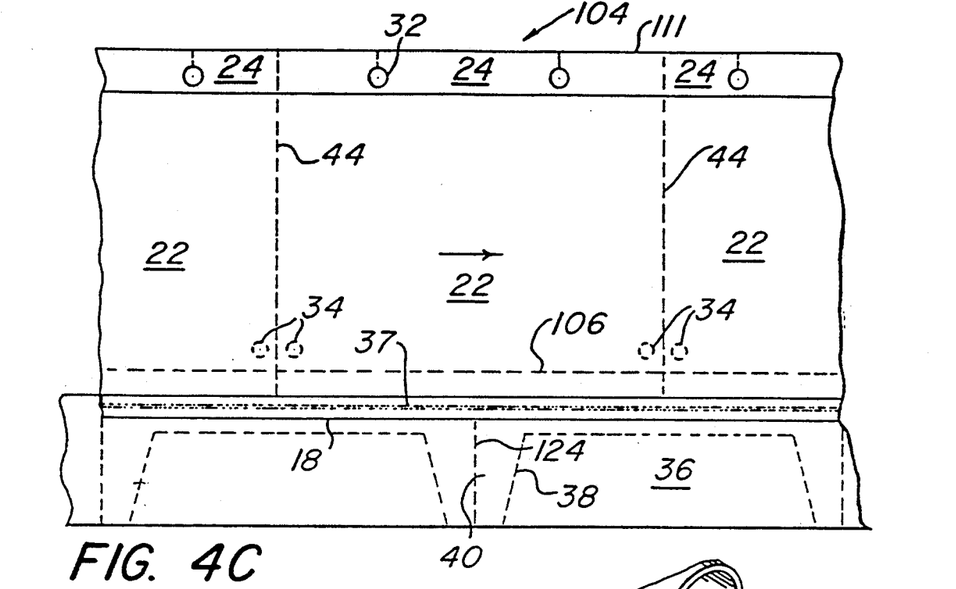
FIG. 4C is a plan view of the composite web after the fold is inverted to form the inner and outer gussets and with the loop handle applied outside the outer gusset region.

Preferably, a web 36 of flexible transparent thermoplastic material is then applied to composite web 104 as shown in FIG. 4C. Web 36 is folded over so as to be generally U-shaped with the edge portions of the web overlying the outer panels 22, 24 outside the outer boundary portions 18, 18' of gusset 14. See also FIG. 5. Thus, one edge portion of web 36 overlies outer front panel 22 while the other edge portion of the web overlies outer rear panel 24. Web 36 is welded to outer panels 22, 24 along zones such as weld lines 37, 37'. Thereafter, the web 36 is die cut at 38 so as to delineate a handle 40 centrally located with respect to the outer front and rear panels. The handle 40 is in the form of a loop and is provided with a line of perforations 124 which bisects the handle. Preferably, handle 40 is narrower at its bight and has a total length which is longer than the width of outer gusset 14 so that the loop can be slipped over a person's arm when the bag is filled as shown in FIG. 1.

Thereafter, the composite web 104 is cut along lines 44 and welded along a narrow margin centered on each line to thereby form the discrete bag 46 as shown in FIG. 2. Lines 44 identify the side edges of the bag 46. Note that U-shaped notch 107, shown in FIG. 4B, is formed, in part so that when the bag's side edges are welded to the side edges of panels 22, 24 there is no interference with rib portion 120 or grooved portion 122. Webs 112, 114 on each bag form a closure device which is resealable.

The bag 46 as shown in FIG. 2 may be loaded as a stack of bags on a bagging machine with prongs extending through the aligned holes 32. When product is machine fed into the bag 46, it is done with sufficient force so as to strip the bag 46 off the prongs and thereby tear the tab 30 from holes 32 to the edge 111 of the tab. At the same time, the air within the bag is forced out of the vent holes 34. After the bag is filled, it is sealed at its bottom and proximal tab 30 by heat welding.

Handle 40 is preferably made from 0.005 inch thick transparent plastic material such as polyethylene so that it does not obscure the printing on the exposed surface of the outer gusset 14 as can be seen from FIG. 1. The only remaining portion of the web 46, other than the handle 40, is the flange 48 which preferably extends across the full width of the front and rear panels of the bag and is welded thereto. Preferably, the widest portion on the handle 40 is adjacent the flanges 48. At the location where the handle merges into the flange 48, it is defined by an arcuate surface as shown more clearly in FIG. 5.

It should be readily appreciated that the preferred bag 46 is assembled from only four separate webs, the inner and outer webs 12, 12', the locked webs 112, 114 which form the closure device, and the handle web 36.

Thus, the bag 46 is assembled in a manner whereby it may be made continuously along a production line.

The bag 46 is capable of being machine loaded with goods which cause the package 10 to approximate a hexahedral shape whereby the bag may be conveniently stacked with the outer (printed) panels prominently displayed. The flexible loop type carrying handle allows the bag to be easily carried off the shelf, in its filled state, merely by slipping the loop type carrying handle over a person's arm.

The inner panels 108, 110 and inner gusset 14' form a sturdy inner bag structure for retaining the goods. See FIG. 3. Heavy loads, for example large quantities of granular goods such as dog food, may be loaded in the inner bag structure which tends to prevent the aroma and/or grease content of the goods from entering the outer bag structure formed by outer panels 22, 24 and outer gusset 14.

The bag is constructed in a manner whereby access may be had to the product contained within the inner bag by first pulling the loop handle 40 apart at perforations 124, then peeling open the closure device formed by webs 112, 114, then opening the outer gusset 14 by tearing the perforations 20, and then severing the inner gusset 14' (using scissors or the like) which is made of a flexible plastic material such as polyethylene and which is therefore frangible. Frangible means "breakable" by any means such as by hand, scissors, knife or other objects. Such access does not destroy the utility of the bag. Once the contents of the inner bag are depleted, the bag may be re-used as a shopping bag wherein articles may be loaded in the inner bag via the opening formed by severing inner gusset 14'. The webs 112, 114 may be re-connected at their mating portions so as to reseal the bag before the contents are fully depleted or, afterwards, when the bag is used as a shopping bag.

Figure 7:
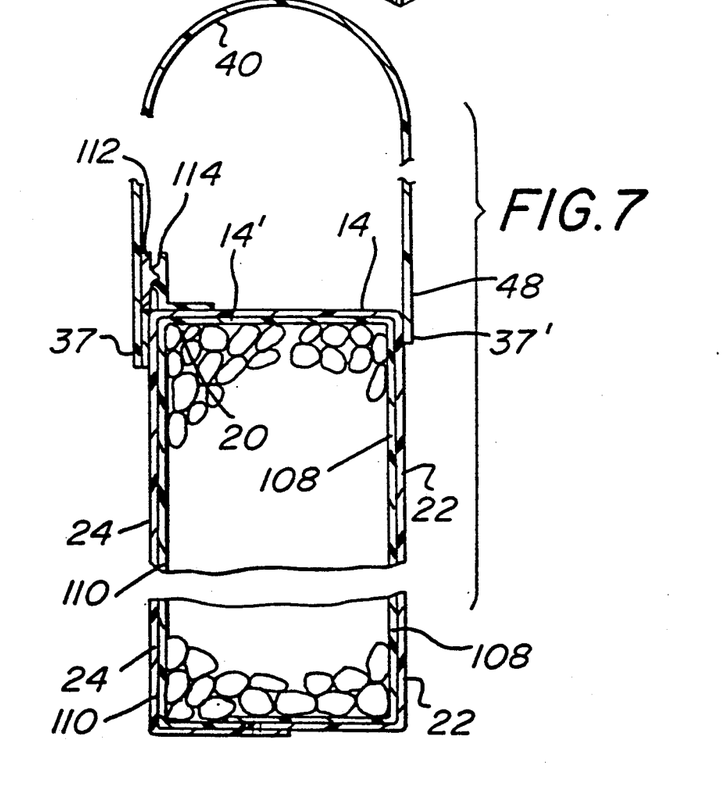
FIG. 7 is a sectional view of an alternate embodiment of the present invention.

In FIG. 7, a second embodiment 10' of the package 10 is illustrated. Package 10' is substantially identical to package 10 described above, except as noted hereinafter. The line of perforations 20 can be placed at either outer boundary 18 or 18' or therebetween. The closure means including webs 112, 114 is moved from fold line 106 to either outer boundary portion 18, 18' of gusset 14 or therebetween. Thus, a portion of the first web 112 or 114 will overlie a portion of the gusset, i.e. between outer boundary 18, 18' and fold line 106, and a portion of the second web will overlie a portion outer panel 22 or 24, i.e. between the outer bound 18 or 18' and the open bottom of the bag. In other words, the closure means straddles either outer boundary 18, 18'. Of course, the closure means and line of perforations is not limited to that exact placement, and may be placed anywhere between outer boundaries 18, 18'.

The manufacture of package 10' is as described above, with regard to package 10, except as noted below. The first fold of the composite web 104 would define an outer boundary 18 or 18'. The closure means is then affixed, e.g. by welding, and the gusset would be formed thereafter.

Figure 8:
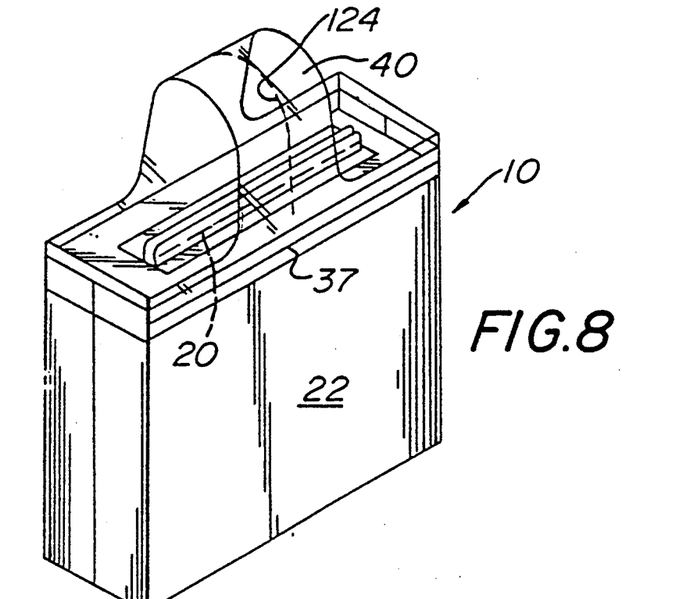
FIG. 8 is an isometric view of an alternate embodiment of the present invention.

In FIG. 8, a third embodiment 10" of the package 10 is illustrated. Package 10" is substantially identical to package 10 or 10' described above, except as noted hereinafter. The closure means including webs 112, 114 is shorter than the distance between the side welds located at lines 44. The line of perforations 20 is preferably coextensive with the closure means.

The present invention may be embodied in other specific forms without departing from the spirit or essential attributes thereof and, accordingly, reference should be made to the appended claims, rather than to the foregoing specification, as indicating the scope of the invention.

I claim:

1. A resealable reusable flexible plastic bag comprising:
    an outer unitary piece of flexible plastic material including generally rectangular front and rear plastic panels and a gusset connecting said panels at a first end portion of the bag;
    an inner unitary piece of flexible plastic material including generally rectangular front and rear panels and a gusset connecting said last-mentioned panels at said first end portion of the bag, ends of said inner and outer unitary pieces of flexible plastic materials opposite said first end of the bag being open to facilitate introducing goods into the bag, the side edges of said gussets and said panels being connected together so that the bag when filled can approximate the shape of a hexahedron with said gusset of said outer piece of flexible plastic material being flattened and closing said first end portion of the bag, at least a portion of said outer unitary piece being frangible so as to facilitate access to the goods in the bag and thereafter permit reuse of the bag;
    closure means connected to said outer unitary piece for preventing access to the goods in the bag when said closure means is closed and for facilitating access to the goods in the bag when said closure means is opened; and
    a handle defined by a loop of flexible plastic material having two ends connected to said bag adjacent said gusset of said outer piece of flexible plastic material.

2. The bag according to claim 1 wherein said closure means comprises first and second mating portions, each mating portion including a pair of end seals and said first and second mating portions of said closure means being secured together along their end seals.

3. The bag according to claim 1 wherein said closure means comprises first and second mating portions, each mating portion having a pair of end seals and wherein each end seal of each of said first and second mating portions of said closure means is arcuate.

4. The bag according to claim 1 wherein said closure means comprises first and second webs supporting first and second mating portions, each web including a pair of end seals and wherein each end seal of each of said first and second webs of said closure means is J-shaped.

5. The bag according to claim 1 further comprising a stress relief slit formed through said inner and outer unitary pieces of flexible plastic material, said slit being located perpendicular to and across a fold line of said gusset and proximate said side edges.

6. The bag according to claim 1 wherein said handle is provided with a flange at each end of said loop, each flange having a length substantially equal to the width of said panels of said outer pieces of flexible plastic material, each flange being secured to said bag.

7. The bag according to claim 1 wherein the length of said loop is longer than the width of said gusset of said outer piece of flexible plastic material whereby the loop can be slipped over a person's arm when the bag is filled.

8. The bag according to claim 1 wherein at least a portion of said loop is frangible.

9. The bag according to claim 8 wherein said frangible portion of said loop is defined by a line of perforations.

10. A resealable reusable flexible plastic bag comprising:
- a unitary piece of flexible plastic material including generally rectangular front and rear plastic panels and a gusset connecting said panels at a first end portion of the bag, ends of said unitary piece of flexible plastic material opposite said first end portion of the bag being open to facilitate introducing goods into the bag, side edges of said gusset and said panels being connected together so that the bag when filled can approximate the shape of a hexahedron with said gusset being flattened and closing said first end portion of the bag, at least a portion of said unitary piece being frangible so as to facilitate access to the goods in the bag and thereafter permit reuse of the bag;
- closure means connected to said unitary piece for preventing access to the goods in the bag when said closure means is closed and for facilitating access to the goods in the bag when said closure means is opened; and
- a handle defined by a loop of flexible plastic material having two ends connected to said bag adjacent said gusset of said unitary piece of flexible plastic material.

11. The bag according to claim 10 wherein said closure means comprises first and second mating portions, each mating portion having a pair of end seals and said first and second mating portions of each closure means are secured together along their end seals.

12. The bag according to claim 10 further comprising a stress relief slit formed through said unitary piece of flexible plastic material, said slit being located perpendicular to and across a fold line of said gusset and proximate said side edges.

13. The bag according to claim 10 wherein said handle is provided with a flange at each end of said loop, each flange having a length substantially equal to the width of said panels, each flange being secured to said bag.

14. The bag according to claim 10 wherein at lest a portion of said loop is frangible.

15. The bag according to claim 14 wherein said frangible portion of said loop is defined by perforations.

16. The bag according to claim 14 wherein the length of said loop is longer than the width of said gusset whereby the loop can be slipped over a person's arm when the bag is filled.

17. A releasable reusable flexible plastic bag comprising:
- an outer unitary piece of flexible plastic material including generally rectangular front and rear plastic panels and a gusset connecting said panels at a first end portion of the bag;
- an inner unitary piece of flexible plastic material including generally rectangular front and rear panels and a gusset connecting said last-mentioned panels at said first end portion of the bag, the ends of said inner and outer unitary pieces of flexible plastic material opposite said first end portion of the bag being open to facilitate introducing goods into the bag, side edges of said gussets and said panels being connected together so that the bag when filled can approximate the shape of a hexahedron with said gusset of said outer piece of flexible plastic material being flattened and closing said first end portion of the bag, at least a portion of said outer unitary piece being frangible so as to facilitate access to the goods in the bag and thereafter permit reuse of the bag; and
- closure means connected to said outer unitary piece for preventing access to the goods in the bag when said closure means is closed and for facilitating access to the goods in the bag when said closure means is opened, said closure means having a length less than a distance between said side edges of said gussets and said panels.

18. A releasable reusable flexible plastic bag comprising:
- a unitary piece of flexible plastic material including generally rectangular front and rear plastic panels and a gusset connecting said panels at a first end portion of the bag, the ends of said unitary piece of flexible plastic material opposite said first end portion of the bag being open to facilitate introducing goods into the bag, side edges of said gusset and said panels being connected together so that the bag when filled can approximate the shape of a hexahedron with said gusset being flattened and closing said first end portion of the bag, at least a portion of said unitary piece being frangible so as to facilitate access to the goods in the bag and thereafter permit reuse of the bag; and
- closure means connected to said unitary piece for preventing access to the goods in the bag when said closure means is closed and for facilitating access to the goods in the bag when said closure means is opened, said closure means having a length less than a distance between said gusset and said panels.

19. A releasable reusable flexible plastic bag comprising:
- an outer unitary piece of flexible plastic material including generally rectangular front and rear plastic panels and a gusset connecting said panels at a first end portion of the bag;
- an inner unitary piece of flexible plastic material including generally rectangular front and rear panels and a gusset connecting said last-mentioned panels at said first end portion of the bag, ends of said inner and outer unitary pieces of flexible plastic material opposite said first end portion of the bag being open to facilitate introducing goods into the bag, side edges of said gussets and said panels being connected together so that the bag when filled can approximate the shape of a hexahedron with said gusset of said outer piece of flexible plastic material being flattened and closing said first end portion of the bag, at least a portion of said outer unitary piece being frangible so as to facilitate access to the goods in the bag and thereafter permit reuse of the bag; and
- closure means connected to said outer unitary piece for preventing access to the goods in the bag when said closure means is closed and for facilitating access to the goods in the bag when said closure means is opened, said closure means including first and second mating portions, a rib on one of said mating portions and a groove on the other of said mating portions, said rib being frictionally engageable in said groove to provide a separable connection.

20. The bag according to claim 19 wherein said first and second mating portions of said closure means are made of a flexible transparent plastic material.

21. A releasable reusable flexible plastic bag comprising:
- an outer unitary piece of flexible plastic material including generally rectangular front and rear plastic panels and a gusset connecting said panels at a first end portion of the bag;
- an inner unitary piece of flexible plastic material including generally rectangular front and rear plastic panels and a gusset connecting said panels at a first end portion of the bag;
- an inner unitary piece of flexible plastic material including generally rectangular front and rear panels and a gusset connecting said last-mentioned panels at said first end portion of the bag, ends of said inner and outer unitary pieces of flexible plastic material opposite said first end portion of the bag being open to facilitate introducing goods into the bag, side edges of said gussets and said panels being connected together so that the bag when filled can approximate the shape of a hexahedron with said gusset of said outer piece of flexible plastic material being flattened and closing said first end portion of the bag, at lest a portion of said outer unitary piece being frangible so as to facilitate access to the goods in the bag thereafter permit reuse of the bag; and
- closure means connected to said outer unitary piece for preventing access to the goods in the bag when said closure means is closed and for facilitating access to the goods in the bag when said closure means is opened, said closure means having a length less than a distance between said side edges of said gussets and said panels.

22. A resealable reusable flexible plastic bag comprising:
- a unitary piece of flexible plastic material including generally rectangular front and rear plastic panels and a gusset connecting said panels at a first end portion of the bag, the ends of said unitary piece of flexible plastic material opposite said first end portion of the bag being open to facilitate introducing goods into the bag, side edges of said gusset and said panels being connected together so that the bag when filled can approximate the shape of a hexahedron with said gusset being flattened and closing said first end portion of the bag, at least a portion of said unitary piece being frangible so as to facilitate access to the goods in the bag and thereafter permit reuse of the bag; and
- closure means connected to said unitary piece for preventing access to the goods in the bag when said closure means is closed and for facilitating access to the goods n the bag when said closure means is opened, said closure means including first and second mating portions, a rib on one of said mating portions and a groove on the other of said mating portions, said rib being fictionally engageable in said groove.

23. The bag according to claim 22 wherein said first and second mating portions of said closure means are made of a flexible transparent plastic material 24. A releasable reusable flexible plastic bag comprising:
- a unitary piece of flexible plastic material including generally rectangular front and rear plastic panels and a gusset connecting said panels at a first end portion of the bag, ends of said unitary piece of flexible plastic material opposite said first end portion of the bag being open to facilitate introducing goods into the bag side edges of said gusset and said panels being connected together so that the bag when filled can approximate the shape of a hexahedron with said gusset being flattened and closing said first end portion of the bag, at least a portion of said unitary piece being frangible so as to facilitate access to the goods in the bag and thereafter permit reuse of the bag; and
- closure means connected to said unitary piece for preventing access to the gods in the bag when said closure means is closed and for facilitating access to the goods in the bag when said closure means is opened, said closure means having a length less than a distance between said side edges of said gussets and said panels.

25. A releasable reusable flexible plastic bag comprising:
- a unitary piece of flexible plastic material including generally rectangular front and rear plastic panels and a gusset connecting said panels at a first end portion of the bag, ends of said unitary piece of flexible plastic material opposite said first end portion of the bag being open to facilitate introducing goods into the bag, side edges of said gusset and said panels being connected together so that the bag when filled can approximate the shape of a hexahedron with said gusset being flattened and closing said first end portion of the bag, at least a portion of said unitary piece being frangible so as to facilitate access to the goods in the bag and thereafter permit reuse of the bag; and
- closure means connected to said unitary piece for preventing access to the goods in the bag when said closure means is closed and for facilitating access to the goods in the bag when said closure means is opened, said closure means being connected to said gusset and one of said panels of said unitary piece of flexible plastic.

* * * * *

UNITED STATES PATENT AND TRADEMARK OFFICE
CERTIFICATE OF CORRECTION

PATENT NO. : 5,112,138

DATED : May 12, 1992

INVENTOR(S) : Harry R. Peppiatt

It is certified that error appears in the above-identified patent and that said Letters Patent is hereby corrected as shown below:

ON THE TITLE PAGE:

REFERENCES CITED [56]

U.S. Patent Documents, "1,701,097 1/1925 Broderick." should read -- 1,701,097 2/1929 Broderick.--

Foreign Patent Documents, "7121512 6/1971 Fed. Rep. of Germany" should read --2121512 6/1971 Fed. Rep. of Germany-- and "2811219 9/1979 Fed. Rep. of Germany." (second occurrence) should be deleted.

COLUMN 1

Line 6, "No. 425,500 filed June 8, 1990," should read -- No. 425,500 filed October 19, 1989,--.

Line 9, "abandoned a" should read --abandoned, a--.

Line 16, "allows" should read --allowed--.

COLUMN 2

Line 64, "proximal" should read --proximate--.

UNITED STATES PATENT AND TRADEMARK OFFICE
CERTIFICATE OF CORRECTION

PATENT NO. : 5,112,138

DATED : May 12, 1992

INVENTOR(S) : Harry R. Peppiatt

It is certified that error appears in the above-identified patent and that said Letters Patent is hereby corrected as shown below:

COLUMN 4

Line 57, "web 46," should read --web 36,--.

COLUMN 5

Line 47, "portion outer" should read --portion of the outer--.

COLUMN 6

Line 60, "pieces" should read --piece--.

COLUMN 7

Line 44, "lest" should read --least--.

Line 52, "releasable" should read --resealable--.

COLUMN 8

Line 13, "releasable" should read --resealable--.

Line 36, "releasable" should read --resealable--.

UNITED STATES PATENT AND TRADEMARK OFFICE
CERTIFICATE OF CORRECTION

PATENT NO. : 5,112,138

DATED : May 12, 1992

INVENTOR(S) : Harry R. Peppiatt

It is certified that error appears in the above-identified patent and that said Letters Patent is hereby corrected as shown below:

COLUMN 9

Line 4, "releasable" should read --resealable--.

Lines 10-13, Lines 10 to 13 should be deleted.

Line 26, "Lest" should read --least--.

Line 28, "bag thereafter" should read --bag and thereafter--.

Line 56, "n" should read --in--.

COLUMN 10

Line 8, "material" should read --material.--.

Line 9, "releasable" should read --resealable--.

Line 17, "bag side" should read --bag, side--.

Line 26, "gods" should read --goods--.

Line 32, "releasable" should read --resealable--.

Signed and Sealed this

Second Day of November, 1993

*Attest:*

BRUCE LEHMAN

*Attesting Officer*  Commissioner of Patents and Trademarks